US009933064B2

United States Patent
Aitcin et al.

(10) Patent No.: US 9,933,064 B2
(45) Date of Patent: Apr. 3, 2018

(54) CONTINUOUSLY VARIABLE TRANSMISSION DRIVE PULLEY

(71) Applicant: BOMBARDIER RECREATIONAL PRODUCTS INC., Valcourt (CA)

(72) Inventors: Xavier-Pierre Aitcin, St-Hyacinthe (CA); Yan Bourgeois, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 15/288,209

(22) Filed: Oct. 7, 2016

(65) Prior Publication Data

US 2017/0023121 A1 Jan. 26, 2017

Related U.S. Application Data

(63) Continuation of application No. 14/784,477, filed as application No. PCT/IB2015/052374 on Mar. 31, 2015, now Pat. No. 9,500,264.

(Continued)

(51) Int. Cl.

| F16H 59/00 | (2006.01) |
| F16H 61/00 | (2006.01) |
| F16H 63/00 | (2006.01) |
| F16H 55/56 | (2006.01) |
| B62M 9/08 | (2006.01) |
| B62M 27/02 | (2006.01) |

(Continued)

(52) U.S. Cl.
CPC .............. *F16H 55/563* (2013.01); *B62M 9/08* (2013.01); *B62M 27/02* (2013.01); *F16H 9/14* (2013.01); *F16H 9/18* (2013.01); *B62M 2027/028* (2013.01); *F16H 2055/366* (2013.01)

(58) Field of Classification Search
CPC ...... F16H 55/563; F16H 55/56; F16H 63/067; F16H 61/66245; F16H 61/66272
USPC ........................................................ 474/14, 19
See application file for complete search history.

(56) References Cited

U.S. PATENT DOCUMENTS 3,224,287 A * 12/1965 Gesche ..................... F16H 9/12
474/19
3,722,308 A * 3/1973 Steuer ..................... F16C 19/50
474/19

(Continued)

FOREIGN PATENT DOCUMENTS

| CA | 2129791 A1 | 2/1996 |
| CA | 2261294 A1 | 2/1997 |

(Continued)

OTHER PUBLICATIONS

International Search Report of PCT/IB2015/052374; Lee W. Young; dated Jul. 28, 2015.

*Primary Examiner* — Henry Y Liu
(74) *Attorney, Agent, or Firm* — BCF LLP

(57) ABSTRACT

A drive pulley for a CVT has a fixed sheave, a movable sheave, a spider, a biasing member biasing the movable sheave axially away from the fixed sheave, at least one centrifugal actuator and first and second rollers rotationally connected to one of the movable sheave and the spider. The first roller rolls along the other one of the movable sheave and the spider as the movable sheave moves axially. The second roller rolls along the other one of the movable sheave and the spider as the movable sheave moves axially. The first and second rollers transfer torque between the movable sheave and the spider.

20 Claims, 12 Drawing Sheets

Related U.S. Application Data

(60) Provisional application No. 61/972,592, filed on Mar. 31, 2014.

(51) Int. Cl.
  *F16H 9/18* (2006.01)
  *F16H 9/14* (2006.01)
  *F16H 55/36* (2006.01)

(56) References Cited

U.S. PATENT DOCUMENTS

| | | | | |
|---|---|---|---|---|
| 3,777,583 A * | 12/1973 | Talbot | F16H 55/563 | 474/14 |
| 3,794,142 A * | 2/1974 | Perreault | F01M 1/06 | 123/196 R |
| 3,800,608 A * | 4/1974 | Bessette | F16H 55/563 | 474/14 |
| 3,861,229 A * | 1/1975 | Domaas | F16H 55/563 | 474/14 |
| 3,868,862 A * | 3/1975 | Bessette | F16H 55/563 | 474/12 |
| 3,916,707 A * | 11/1975 | Wells | F16H 61/66245 | 474/14 |
| 3,958,461 A * | 5/1976 | Aaen | F16H 55/563 | 474/14 |
| 3,971,263 A * | 7/1976 | Beaudoin | F16H 55/563 | 474/12 |
| 4,027,544 A * | 6/1977 | Kobayashi | F16H 55/563 | 474/14 |
| 4,483,686 A * | 11/1984 | Kobayashi | F16H 55/563 | 474/11 |
| 4,564,357 A * | 1/1986 | Thirion de Briel | F02B 67/06 | 474/14 |
| 4,575,363 A * | 3/1986 | Burgess | F16H 55/563 | 474/14 |
| 4,608,030 A * | 8/1986 | Thirion deBriel | F16H 55/563 | 474/13 |
| 4,826,467 A * | 5/1989 | Reese | F16H 55/563 | 474/14 |
| 5,254,041 A * | 10/1993 | Duclo | F16H 55/563 | 474/14 |
| 5,326,330 A * | 7/1994 | Bostelmann | F16H 55/563 | 474/13 |
| 5,358,450 A * | 10/1994 | Robert | F16H 55/563 | 474/13 |
| 5,468,191 A | 11/1995 | Monahan | | |
| 5,478,284 A | 12/1995 | Imaida et al. | | |
| 5,516,332 A * | 5/1996 | Robert | F16H 55/563 | 474/13 |
| 5,516,333 A * | 5/1996 | Benson | F16H 55/56 | 192/54.52 |
| 5,562,555 A * | 10/1996 | Peterson | F16H 55/563 | 192/105 CD |
| 5,597,060 A * | 1/1997 | Huddleston | F16H 55/563 | 192/105 C |
| 5,647,810 A * | 7/1997 | Huddleston | F16C 13/006 | 192/105 CD |
| 5,692,982 A * | 12/1997 | Peterson | F16H 55/563 | 192/105 CD |
| 5,692,983 A * | 12/1997 | Bostelmann | F16H 55/563 | 474/14 |
| 5,720,681 A * | 2/1998 | Benson | F16H 55/56 | 192/54.52 |
| 5,795,255 A * | 8/1998 | Hooper | F16H 61/66245 | 474/14 |
| 5,941,787 A | 8/1999 | Imaida et al. | | |
| 5,967,286 A * | 10/1999 | Hokanson | F16H 55/56 | 192/110 R |
| 6,033,329 A * | 3/2000 | Erlandson | F16H 55/56 | 474/14 |
| 6,095,937 A * | 8/2000 | Aaen | F16H 61/66227 | 192/54.52 |
| 6,120,399 A * | 9/2000 | Okeson | F16H 55/56 | 474/12 |
| 6,149,540 A * | 11/2000 | Johnson | F16H 9/18 | 474/14 |
| 6,309,317 B1 * | 10/2001 | Joss | F16D 43/06 | 474/13 |
| 6,334,826 B1 * | 1/2002 | Takagi | F16H 55/563 | 474/12 |
| 6,346,056 B1 * | 2/2002 | Nouis | F16H 61/66272 | 474/14 |
| 6,379,274 B1 * | 4/2002 | Robert | F16H 55/56 | 474/12 |
| 6,406,390 B1 * | 6/2002 | Roby | F16H 55/56 | 474/12 |
| 6,520,878 B1 * | 2/2003 | Leclair | F16H 55/563 | 474/12 |
| 6,569,043 B2 * | 5/2003 | Younggren | F16H 55/56 | 474/19 |
| 6,733,406 B2 * | 5/2004 | Kitai | F16H 55/56 | 474/13 |
| 6,743,129 B1 * | 6/2004 | Younggren | F16H 55/56 | 474/17 |
| 6,811,504 B2 * | 11/2004 | Korenjak | F01B 1/12 | 474/13 |
| 6,953,400 B2 * | 10/2005 | Kalies | F16H 55/56 | 472/10 |
| 6,958,024 B2 * | 10/2005 | Takano | F16H 55/563 | 474/12 |
| 6,997,833 B2 * | 2/2006 | Labbe | F16H 61/66272 | 474/12 |
| 7,037,225 B2 * | 5/2006 | Takagi | F16H 9/125 | 474/8 |
| 7,037,226 B2 * | 5/2006 | Zulawski | F16H 55/56 | 474/19 |
| 7,090,600 B2 * | 8/2006 | Lohr | F16H 55/563 | 474/14 |
| 7,927,241 B2 * | 4/2011 | Labbe | F16H 55/56 | 474/10 |
| 8,409,039 B2 * | 4/2013 | Beyer | F16H 55/563 | 474/14 |
| 8,894,520 B2 * | 11/2014 | Labbe | F16H 55/56 | 474/19 |
| 2002/0065156 A1 * | 5/2002 | Younggren | F16H 55/56 | 474/19 |
| 2002/0119846 A1 * | 8/2002 | Kitai | F16H 55/56 | 474/14 |
| 2002/0123400 A1 * | 9/2002 | Younggren | F16H 55/563 | 474/14 |
| 2003/0054909 A1 * | 3/2003 | Flaspeter | F16H 7/24 | 474/19 |
| 2003/0092529 A1 | 5/2003 | Gu et al. | | |
| 2004/0063524 A1 * | 4/2004 | Zulawski | F16H 55/56 | 474/19 |
| 2004/0082415 A1 * | 4/2004 | Borghi | F16H 55/563 | 474/13 |
| 2004/0214668 A1 * | 10/2004 | Takano | F16H 55/563 | 474/14 |
| 2004/0229724 A1 * | 11/2004 | Kalies | F16H 55/56 | 474/19 |
| 2005/0043128 A1 * | 2/2005 | Zulawski | F16H 55/56 | 474/19 |
| 2005/0079937 A1 * | 4/2005 | Heide | F16H 9/18 | 474/14 |
| 2008/0125256 A1 * | 5/2008 | Murayama | F16H 57/04 | 474/14 |
| 2009/0042678 A1 * | 2/2009 | Labbe | F16H 55/56 | 474/19 |
| 2009/0227404 A1 * | 9/2009 | Beyer | F16H 55/563 | 474/14 |
| 2010/0144487 A1 * | 6/2010 | Noboru | F02N 15/08 | 477/39 |
| 2011/0092325 A1 * | 4/2011 | Vuksa | F16H 9/18 | 474/14 |
| 2012/0214626 A1 * | 8/2012 | Cook | F16H 61/66245 | 474/14 |

(56) References Cited

U.S. PATENT DOCUMENTS

| | | | | |
|---|---|---|---|---|
| 2014/0004984 A1* | 1/2014 | Aitcin | ...................... | F16H 55/56 |
| | | | | 474/14 |
| 2014/0235382 A1* | 8/2014 | Tsukamoto | ........... | F16H 63/067 |
| | | | | 474/14 |
| 2015/0111674 A1* | 4/2015 | Yuan | ......................... | F16H 9/12 |
| | | | | 474/14 |
| 2015/0267792 A1* | 9/2015 | Hochmayr | ............ | F16H 63/065 |
| | | | | 474/14 |
| 2017/0030454 A1* | 2/2017 | Aitcin | ....................... | F16H 9/12 |

FOREIGN PATENT DOCUMENTS

| | | |
|---|---|---|
| CA | 2240636 A1 | 1/1999 |
| CA | 2270002 A1 | 10/2000 |
| CA | 2346318 A1 | 11/2002 |
| CA | 2411316 A1 | 5/2004 |
| CA | 2389965 C | 1/2005 |
| CA | 2493455 A1 | 7/2005 |
| CA | 2346321 C | 8/2007 |
| CA | 2346319 C | 9/2007 |
| CA | 2385040 C | 6/2008 |
| CA | 2774253 A1 | 3/2011 |
| WO | 2013032463 A2 | 3/2013 |
| WO | 2013032463 A3 | 2/2014 |
| WO | 2015151033 A1 | 10/2015 |

\* cited by examiner

CONTINUOUSLY VARIABLE TRANSMISSION DRIVE PULLEY

CROSS-REFERENCE

The present application is a continuation of U.S. patent application Ser. No. 14/784,477, filed Oct. 14, 2015, which is a National Phase Entry of International Patent Application No. PCT/IB15/52374, filed Mar. 31, 2015, which claims priority to U.S. Provisional Patent Application No. 61/972,592, filed Mar. 31, 2014, the entirety of all of which is incorporated herein by reference.

TECHNICAL FIELD

The present technology relates to drive pulleys for continuously variable transmissions.

BACKGROUND

Conventional snowmobile powertrains incorporate a continuously variable transmission (CVT) having a drive pulley that is operatively coupled to the engine crankshaft and a driven pulley coupled to a driven shaft. The drive pulley transfers torque to the driven pulley via a drive belt looped around both pulleys. Typically, the driven shaft is a transverse jackshaft which drives the input member of a chain and sprocket reduction drive. The output of the reduction drive is coupled to one end of an axle on which are located the drive track drive sprocket wheels.

The drive pulley includes centrifugal actuators through which the drive ratio of the drive pulley is varied progressively as a function of the engine speed. The centrifugal actuators are connected to a movable sheave of the drive pulley. The drive pulley also includes a fixed sheave which is axially fixed. The fixed sheave and the movable sheave are rotatable together. The movable sheave is movable axially toward the fixed sheave by the action of the centrifugal actuators and away from the fixed sheave by a biasing spring. The centrifugal actuators generally consist of centrifugal weights in the form of adjusting arms. Each of the arms is connected to the movable sheave of the drive pulley by a pin, and pivots outwards about its corresponding pin. As they pivot, the arms are in contact with corresponding rollers disposed on a spider fixed relative to the fixed sheave. When the adjusting arms pivot outwards as a result of centrifugal force, they slide against their corresponding roller and the axially movable sheave is pushed towards the fixed sheave.

Due to manufacturing tolerances and the type of connection used, it is possible that the spider and movable sheave can rotate slightly relative to one another during acceleration and deceleration of the drive pulley. As a result, the adjusting arms move slightly in a direction generally parallel to an axis of rotation or their corresponding rollers. This is sometimes referred to as backlash. This slight movement causes rubbing of the adjustable arms against their respective rollers and can result in portions of the arms, the rollers or both to wear and form a flat portion or a recess. In the case of worn surfaces of the arms, the way in which the movable sheave is moved by the arms in response to the speed of rotation of the drive pulley is negatively affected. In the case of worn surfaces of the rollers, it is possible that once the worn surface of a roller makes contact with its corresponding arm, the roller stops rolling, thereby further rubbing against the arm and exacerbating the problem.

Therefore, there is a need for a drive pulley that reduces or eliminates relative rotation between the spider and the movable sheave to help prevent wear of the centrifugal actuators.

In some implementations, the fixed sheave is mounted on a fixed sheave shaft, the movable sheave is mounted on a movable sheave shaft, and the spring biasing the movable sheave away from the fixed sheave is disposed radially between the fixed and movable sheave shafts. In order to reduce friction between the two shafts one or more low friction bushings are disposed radially between the shafts. However, due to the presence of the spring radially between the two shafts, the maximum length of the bushings is limited, which can limit the life of the bushings.

Therefore, there is a need for a drive pulley having a connection between the parts thereof that permit relatively easy displacement of the movable sheave relative to the fixed sheave in an axial direction, while allowing the length of the bushing(s) to be selected in order to provide a desired durability to friction ratio.

SUMMARY

It is an object of the present to ameliorate at least some of the inconveniences present in the prior art.

According to an aspect of the present technology, there is provided a drive pulley for a continuously variable transmission having a fixed sheave having an axis of rotation, a movable sheave axially movable relative to the fixed sheave, a spider axially fixed relative to the fixed sheave and rotationally fixed relative to the movable sheave, the movable sheave being disposed axially between the spider and the fixed sheave, a biasing member biasing the movable sheave axially away from the fixed sheave, at least one centrifugal actuator including an arm pivotally connected to one of the movable sheave and the spider, the arm pivoting away from the one of the movable sheave and the spider as a speed of rotation of the drive pulley increases, the arm pushing against another one of the movable sheave and the spider as the arm pivots away from the one of the movable sheave and the spider, thereby moving the movable sheave axially toward the fixed sheave, and at least one roller assembly. The at least one roller assembly has a first roller rotationally connected to one of the movable sheave and the spider and abutting another one of the movable sheave and the spider, the first roller rolling along the other one of the movable sheave and the spider as the movable sheave moves axially, and a second roller rotationally connected to the one of the movable sheave and the spider and abutting the other one of the movable sheave and the spider, the second roller rolling along the other one of the movable sheave and the spider as the movable sheave moves axially. The first and second rollers are disposed on a same side of a first plane containing the axis of rotation of the fixed sheave. The first and second rollers are disposed on a same side of a second plane containing the axis of rotation of the fixed sheave and being perpendicular to the first plane. The first and second rollers transfer torque between the movable sheave and the spider.

In some implementations of the present technology, for each of the at least one roller assembly the first and second rollers are rotationally connected to the movable sheave.

In some implementations of the present technology, each of the at least one roller assembly also has a radially extending axle connected to the movable sheave. For each of the at least one roller assembly the first and second rollers are rotationally mounted to the axle and are rotatable about an axis of the axle.

In some implementations of the present technology, for each of the at least one roller assembly the first and second rollers are slidable along the axle.

In some implementations of the present technology, for each of the at least one roller assembly: the spider defines a passage between a first wall and a second wall, the first and second rollers are disposed in the passage, the first roller abuts and rolls along the first wall and is spaced from the second wall, and the second roller abuts and rolls along the second wall and is spaced from the first wall.

In some implementations of the present technology, for each of the at least one roller assembly: the first roller is larger than the second roller, and the first roller is disposed radially outward of the second roller.

In some implementations of the present technology, for each of the at least one roller assembly: the first roller is heavier than the second roller; and the first roller is disposed radially outward of the second roller.

In some implementations of the present technology, for each of the at least one roller assembly: a first surface of the first roller abutting the first wall is angled relative to an axis of rotation of the first roller, a second surface of the first wall abutting the first surface of the first roller is angled relative to the axis of rotation of the first roller, a third surface of the second roller abutting the second wall is angled relative to an axis of rotation of the second roller, and a fourth surface of the second wall abutting the third surface of the second roller is angled relative to the axis of rotation of the second roller.

In some implementations of the present technology, for each of the at least one roller assembly: a fifth surface of the second roller abutting the second wall is parallel to the axis of rotation of the second roller, and a sixth surface of the second wall abutting the fifth surface of the second roller is parallel to the axis of rotation of the second roller.

In some implementations of the present technology, for each of the at least one roller assembly: the first and second surfaces extend toward the axis of rotation of the first roller as they extend away from the axis of rotation of the fixed sheave, and the third and fourth surfaces extend toward the axis of rotation of the second roller as they extend away from the axis of rotation of the fixed sheave.

In some implementations of the present technology, for each of the at least one roller assembly, the first and second rollers rotate about a common axis of rotation.

In some implementations of the present technology, for each of the at least one roller assembly, the first and second rollers rotate about a common axis of rotation, the common axis of rotation being perpendicular to and intersecting an axis of rotation of the fixed sheave.

In some implementations of the present technology, for each of the at least one roller assembly, the first roller has a larger diameter than the second roller.

In some implementations of the present technology, for each of the at least one roller assembly, a contact surface between the first roller and the other one of the movable sheave and the spider is larger than a contact surface between the second roller and the other one of the movable sheave and the spider.

In some implementations of the present technology, the at least one centrifugal actuator is three centrifugal actuators disposed at 120 degrees from each other. The at least one roller assembly is three roller assemblies disposed at 120 degrees from each other. The centrifugal actuators and roller assemblies are arranged in an alternating arrangement and are disposed at 60 degrees from each other.

In some implementations of the present technology, the arm of the at least one centrifugal actuator abuts a third roller rotationally connected to another one of the movable sheave and the spider.

In some implementations of the present technology, a damper connects the fixed sheave to the spider and transfers torque between the fixed sheave and the spider.

In some implementations of the present technology, a fixed sheave shaft is connected to the fixed sheave, and a movable sheave shaft is connected to the movable sheave. The fixed sheave shaft is disposed at least in part inside the movable sheave shaft. The movable sheave shaft is disposed at least in part inside the biasing member. The biasing member is disposed at least in part inside the spider.

In some implementations of the present technology, for each of the at least one roller assembly, as the first and second rollers wear, the first and second rollers continue to roll along the other one of the movable sheave and the spider as the movable sheave moves axially.

According to another aspect of the present technology, there is provided a continuously variable transmission has the drive pulley according to any one of the above-mentioned implementations, a driven pulley and a drive belt looped around the fixed and movable sheaves. The driven pulley has a fixed sheave and a movable sheave axially movable relative to the fixed sheave.

According to another aspect of the present technology, there is provided a vehicle having a frame, a motor connected to the frame, the above mentioned continuously variable transmission, the drive pulley being operatively connected to and driven by the motor, a driven shaft connected to and driven by the driven pulley, and at least one ground engaging member operatively connected to the driven shaft.

In some implementations of the present technology, the frame includes a tunnel, and the at least one ground engaging member is a drive track disposed at least in part under the tunnel. The vehicle also has at least one ski operatively connected to the frame, and a straddle seat disposed above the tunnel.

Should there be contradictions between the definitions of terms provided in documents incorporated herein by reference and definitions of such terms provided in the present application, the definitions in the present application prevail.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

A drive pulley for a continuously variable transmission (CVT) will be described with respect to a snowmobile 10. However, it is contemplated that the drive pulley could be used in a CVT for other vehicles, such as, but not limited to, on-road vehicles, off-road vehicles, a motorcycle, a scooter, a three-wheel road vehicle and an all-terrain vehicle (ATV). It is also contemplated that the CVT could be used in devices other than vehicles.

Figure 1:
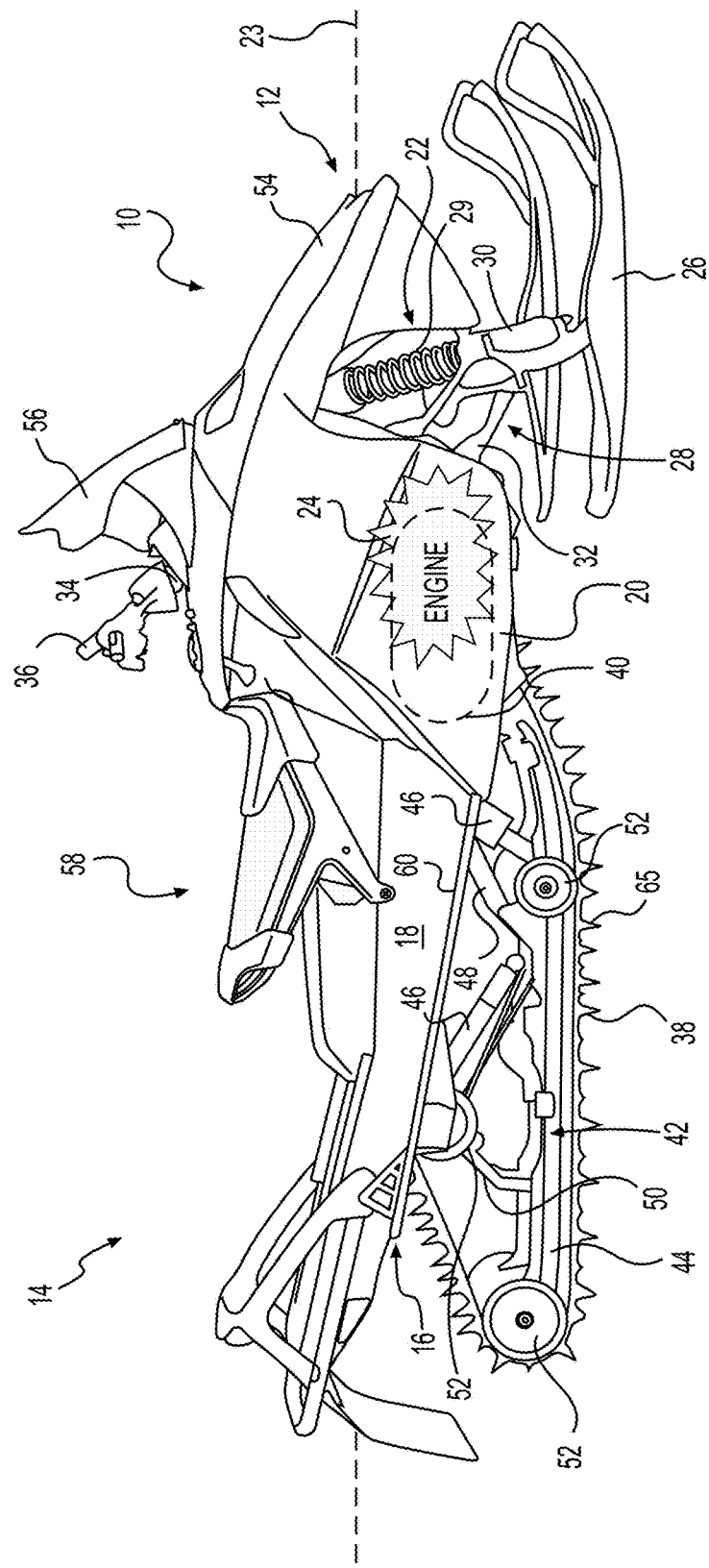
FIG. 1 is a right perspective view of a snowmobile.

Turning now to FIG. 1, a snowmobile 10 includes a forward end 12 and a rearward end 14 that are defined consistently with a forward travel direction of the snowmobile 10. The snowmobile 10 includes a frame 16 that includes a tunnel 18, an motor cradle portion 20 and a front suspension assembly portion 22. The tunnel 18 consists of one or more pieces of sheet metal arranged to form an inverted U-shape that is connected at the front to the motor cradle portion 20 and extends rearward therefrom along the longitudinal axis 23. A motor, which in the present implementation is an internal combustion engine 24 (schematically illustrated in FIG. 1), is carried by the motor cradle portion 20 of the frame 16. The internal construction of the engine 24 may be of any known type such as a two-stroke engine, a four-stroke engine or a diesel engine. It is contemplated that the engine 24 could be replaced by other types of motors, such as, but not limited to, an electric motor or an electric/internal combustion hybrid engine. Two skis 26 are positioned at the forward end 12 of the snowmobile 10 and are attached to the front suspension assembly portion 22 of the frame 16 through a front suspension assembly 28. The front suspension assembly 28 includes shock absorber assemblies 29, ski legs 30 and supporting arms 32. Ball joints and steering rods (not shown) operatively connecting the skis 26 to a steering column 34. A steering device in the form of handlebar 36 is attached to the upper end of the steering column 34 to allow a driver to rotate the ski legs 30 and thus the skis 26, in order to steer the snowmobile 10.

An endless drive track 38 is disposed generally under the tunnel 18 and is operatively connected to the engine 24 through a CVT 40 (schematically illustrated by broken lines in FIG. 1) which will be described in greater detail below. The endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes a plurality of shock absorbers 46 which may further include coil springs (not shown) surrounding the shock absorbers 46. Suspension arms 48 and 50 are provided to attach the slide rails 44 to the frame 16. A plurality of idler wheels 52 are also provided in the rear suspension assembly 42. Other types and geometries of rear suspension assemblies are also contemplated.

At the forward end 12 of the snowmobile 10, fairings 54 enclose the engine 24 and the CVT 40, thereby providing an external shell that protects the engine 24 and the CVT 40. The fairings 54 include a hood and one or more side panels that can be opened to allow access to the engine 24 and the CVT 40 when this is required, for example, for inspection or maintenance of the engine 24 and/or the CVT 40. A windshield 56 is connected to the fairings 54 near the forward end 12 of the snowmobile 10. Alternatively the windshield 56 could be connected directly to the handlebar 36. The windshield 56 acts as a wind screen to lessen the force of the air on the driver while the snowmobile 10 is moving forward.

A straddle-type seat 58 is positioned over the tunnel 18. Two footrests 60 are positioned on opposite sides of the snowmobile 10 below the seat 58 to accommodate the driver's feet.

Figure 2:
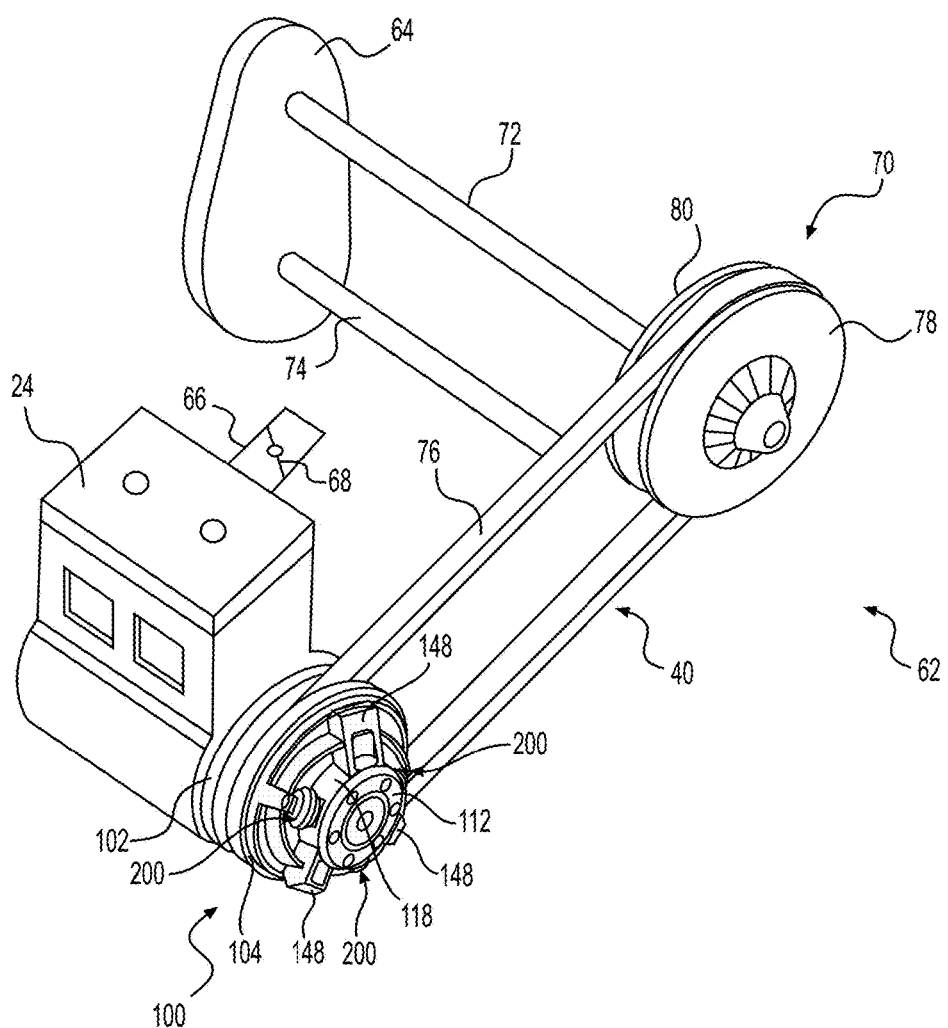
FIG. 2 is schematic representation of a perspective view, taken from a front, left side, of a powertrain of the snowmobile of FIG. 1.

FIG. 2 schematically illustrates a powertrain 62 of the snowmobile 10. The powertrain 62 includes the engine 24, the CVT 40 and a fixed ratio reduction drive 64. A throttle body 66 having a throttle valve 68 therein is connected to air intake ports of the engine 24 to control the flow of air to the engine 24. It is contemplated that the throttle body 66 could be replaced by a carburetor. The engine 24 drives a crankshaft (not shown) that rotates about a horizontally disposed axis that extends generally transversely to the longitudinal axis 23 of the snowmobile 10. The crankshaft drives the CVT 40 for transmitting torque to the endless drive track 38 for propulsion of the snowmobile 10. The CVT 40 includes a drive pulley 100 coupled to the crankshaft to rotate with the crankshaft of the engine 24 and a driven pulley 70 coupled to one end of a transversely mounted jackshaft 72 that is supported on the frame 16 through bearings. The opposite end of the transversely mounted jackshaft 72 is connected to the input member of the reduction drive 64 and the output member of the reduction drive 64 is connected to a drive axle 74 carrying sprocket wheels (not shown) that form a driving connection with the drive track 38.

The drive pulley 100 of the CVT 40 includes a pair of opposed frustoconical belt drive sheaves 102 and 104 between which a drive belt 76 is located. The drive belt 76 is made of rubber, but it is contemplated that it could be made of metal linkages or of a polymer. The drive pulley 100 will be described in greater detail below. The driven pulley 70 includes a pair of frustoconical belt drive sheaves 78 and 80 between which the drive belt 76 is located. As can be seen, the drive belt 76 is looped around both the drive pulley 100 and the driven pulley 70. The torque being transmitted to the driven pulley 70 provides the necessary clamping force on the drive belt 76 through its torque sensitive mechanical device in order to efficiently transfer torque to the other powertrain components.

In the present implementation, the drive pulley 100 rotates at the same speed as the crankshaft of the engine 24 whereas the speed of rotation of the transversely mounted jackshaft 72 is determined in accordance with the instantaneous ratio of the CVT 40, and the drive axle 74 rotates at a lower speed than the transversely mounted jackshaft 72 because of the action of the reduction drive 64. The input member of the reduction drive 64 consists of a small sprocket connected to the transversely mounted jackshaft 72 and coupled to drive an output member consisting of a larger sprocket connected to the drive axle 74 through a driving chain, all enclosed within the housing of the reduction drive 64.

It is contemplated that the drive pulley 100 could be coupled to an engine shaft other than the crankshaft, such as an output shaft, a counterbalance shaft, or a power take-off shaft driven by the engine 24. The shaft driving the drive pulley 100 is therefore generally referred to herein as the driving shaft. Similarly, it is contemplated that the driven pulley 70 could be coupled to a shaft other than the transversely mounted jackshaft 72, such as directly to the drive axle 74 or any other shaft operatively connected to the propulsion element of the vehicle (i.e. the drive track 38 in the case of the snowmobile 10). The shaft driven by the driven pulley 70 is therefore generally referred to herein as the driven shaft.

Turning now to FIGS. 3 to 9, the drive pulley 100 will be described in more detail. As discussed above, the drive pulley 100 includes a pair of opposed frustoconical belt drive sheaves 102 and 104. Both sheaves 102 and 104 rotate together with the driving shaft. The sheave 102 is fixed in an axial direction relative to the driving shaft, and is therefore referred to as the fixed sheave 102. The fixed sheave 102 is also rotationally fixed relative to the driving shaft. The sheave 104 can move toward or away from the fixed sheave 102 in the axial direction of the driving shaft in order to change the drive ratio of the CVT 40, and is therefore referred to as the movable sheave 104. As can be seen in FIG. 2, the fixed sheave 102 is disposed between the movable sheave 104 and the engine 24.

Figure 6:
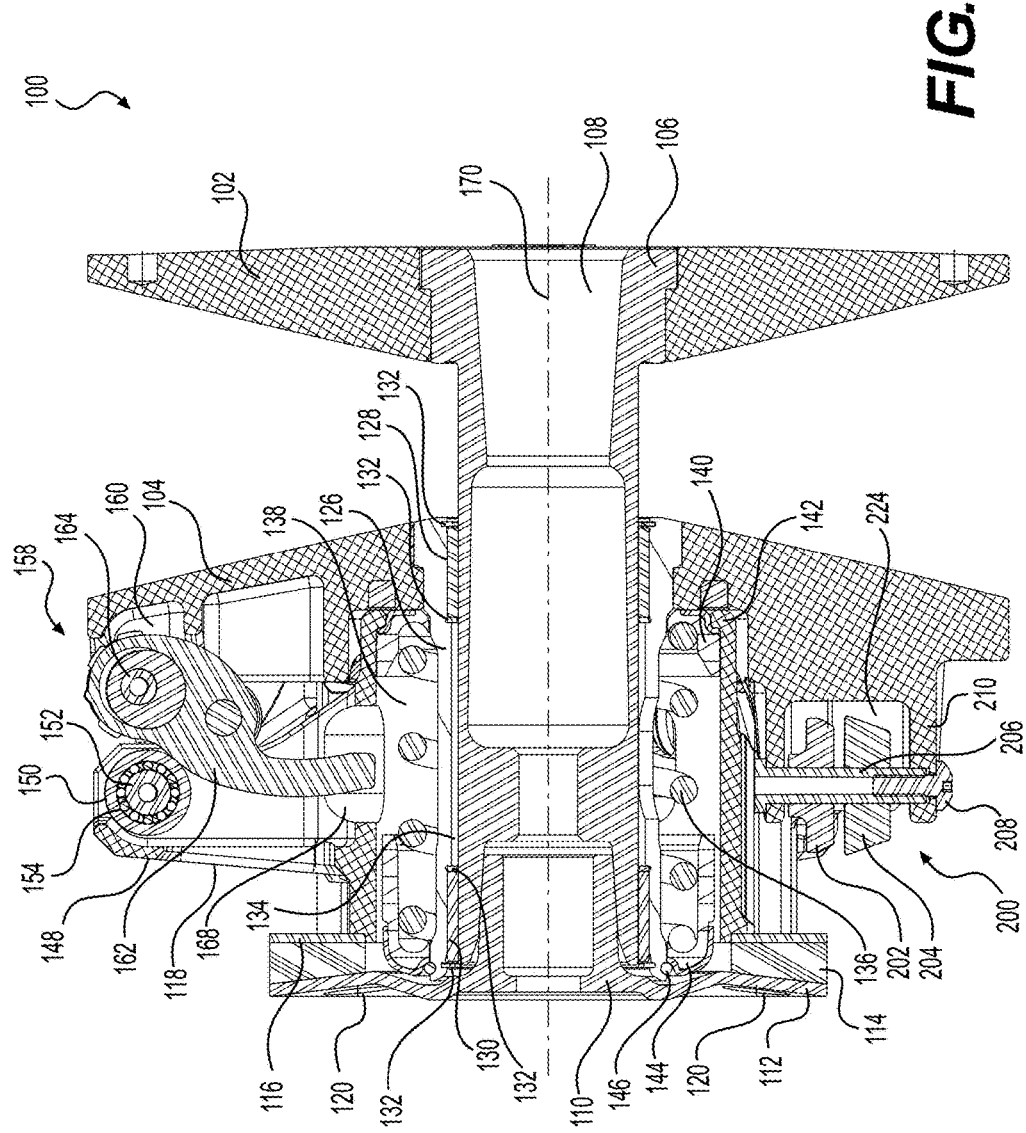
FIG. 6 is a cross-sectional view of the drive pulley of FIG. 3 taken through line 6-6 of FIG. 5, with the drive pulley in an opened position.
Figure 7:
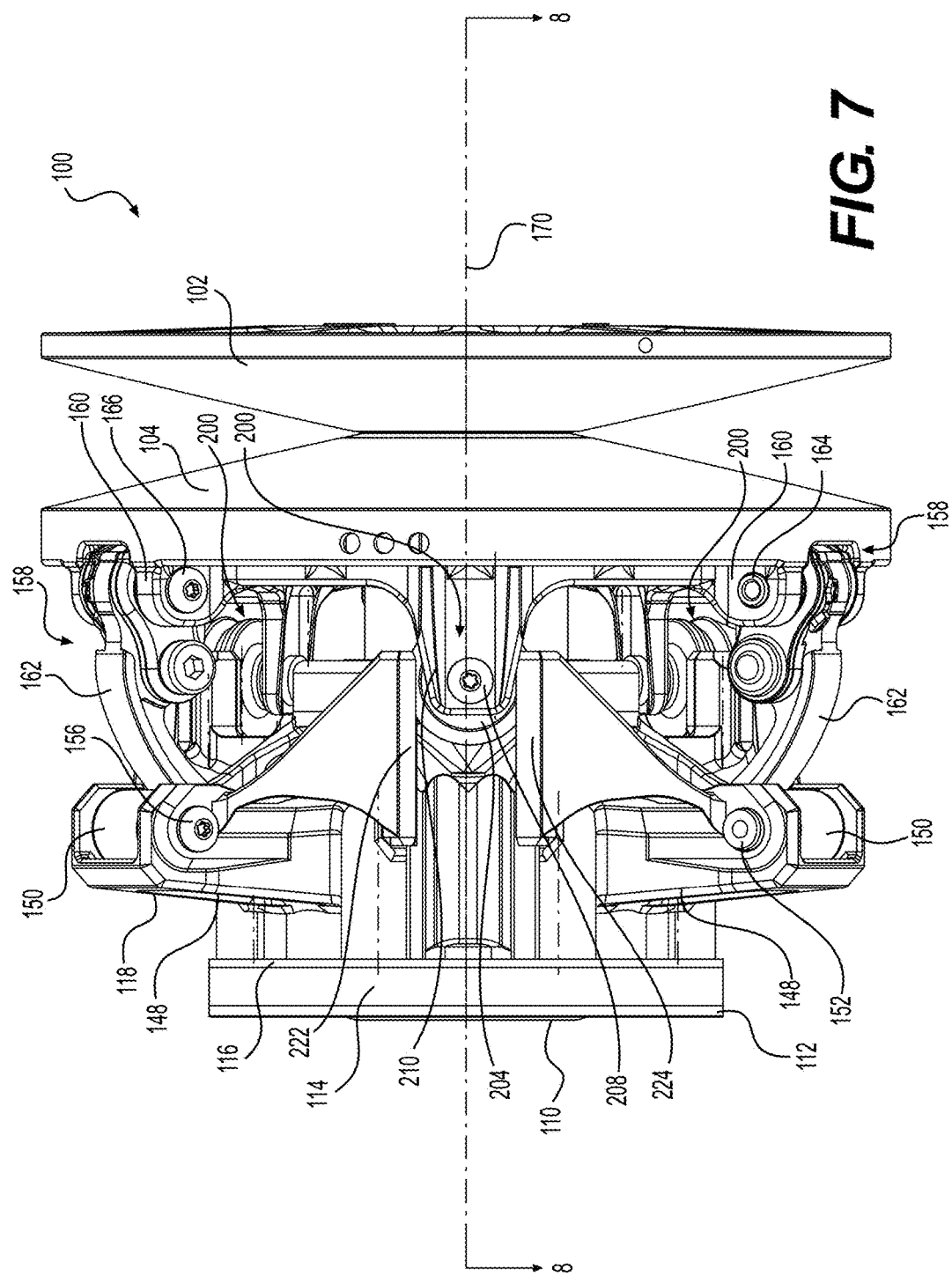
FIG. 7 is a bottom plan view of the drive pulley of FIG. 3, with the drive pulley in a closed position.

The fixed sheave 102 is mounted on a fixed sheave shaft 106. The fixed sheave 102 is press-fitted on the fixed sheave shaft 106 such that the fixed sheave 102 rotates with the fixed sheave shaft 106. It is contemplated that the fixed sheave 102 could be connected to the fixed sheave shaft 106 in other known manners to make the fixed sheave 102 rotationally and axially fixed relative to the fixed sheave shaft 106. As can be seen in FIG. 6, the fixed sheave shaft 106 is hollow and has a tapered hollow portion 108. The tapered hollow portion 108 receives the end of the driving shaft therein to transmit torque from the engine 24 to the drive pulley 100. A fastener (not show) is inserted in the outer end (i.e. the left side with respect to FIG. 6) of the drive pulley 100, inside the fixed sheave shaft 106, and screwed into the end of the driving shaft to prevent axial displacement of the fixed sheave shaft 106 relative to the driving shaft. It is contemplated that the fixed sheave shaft 106 could be connected to the driving shaft in other known manners to make the fixed sheave shaft 106 rotationally and axially fixed relative to the driving shaft. It is also contemplated that the driving shaft could be the fixed sheave shaft 106.

A cap 110 is taper-fitted in the outer end of the fixed sheave shaft 106. The fastener used to connect the driving shaft to the fixed sheave shaft 106 is also inserted through the cap 110 to connect the cap 110 to the fixed sheave shaft 106. It is contemplated that the cap 110 could be connected to the fixed sheave shaft 106 by other means. The radially outer portion of the cap 110 forms a ring 112. An annular rubber damper 114 is connected to the ring 112. Another ring 116 is connected to the rubber damper 114 such that the rubber damper 114 is disposed between the rings 112, 116. As can be seen in FIG. 6, the rubber damper 114 and the ring 116 are disposed radially outward of the fixed sheave shaft 106. In the present implementation, the rubber damper 114 is vulcanized to the rings 112, 116, but it is contemplated that they could be connected to each other by other means such as by using an adhesive. It is also contemplated that the damper 114 could be made of a material other than rubber.

Figure 3:
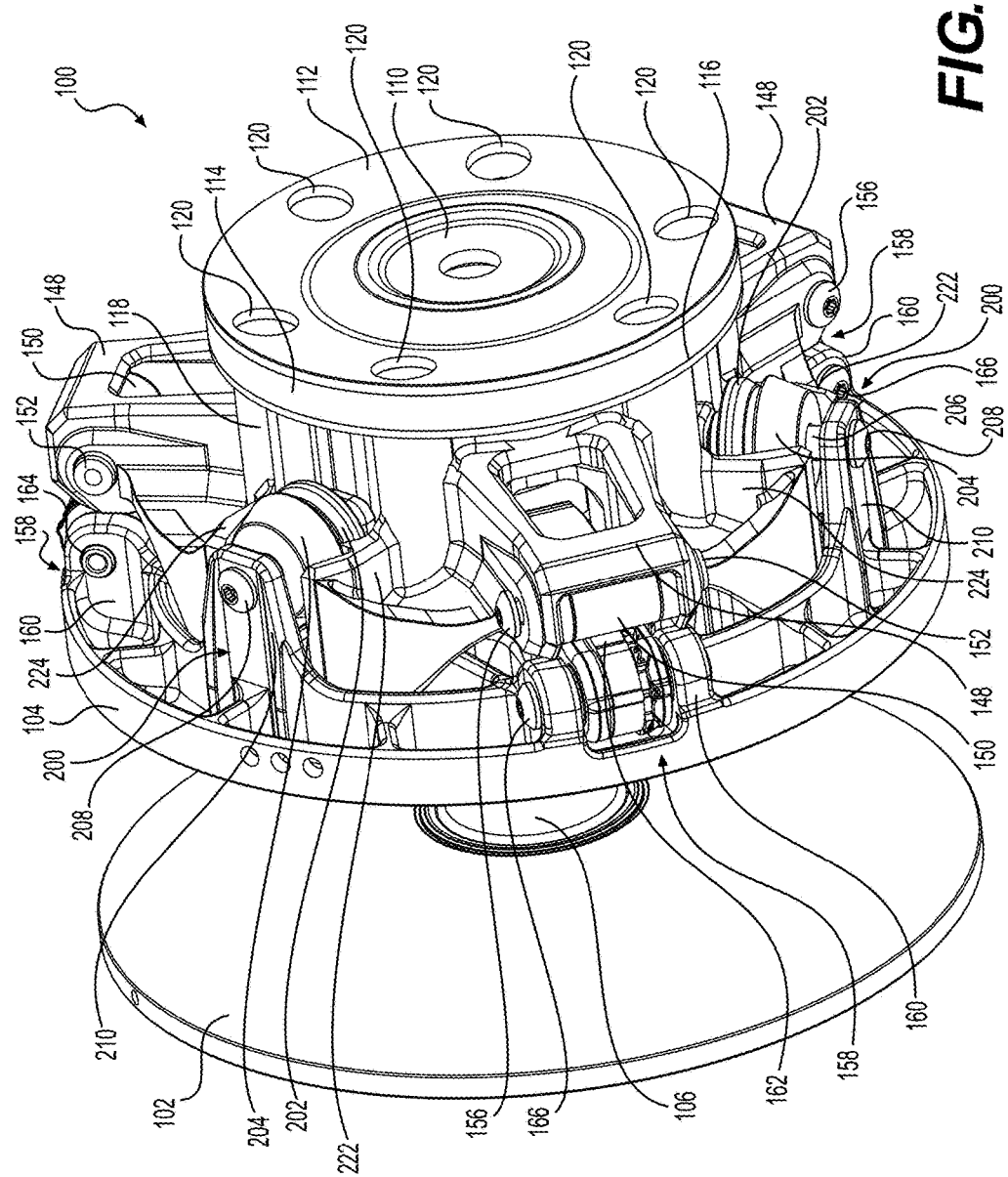
FIG. 3 is a perspective view, taken from a bottom, front, left side of a drive pulley of a CVT of the powertrain of FIG. 2, with the drive pulley in an opened position.
Figure 4:
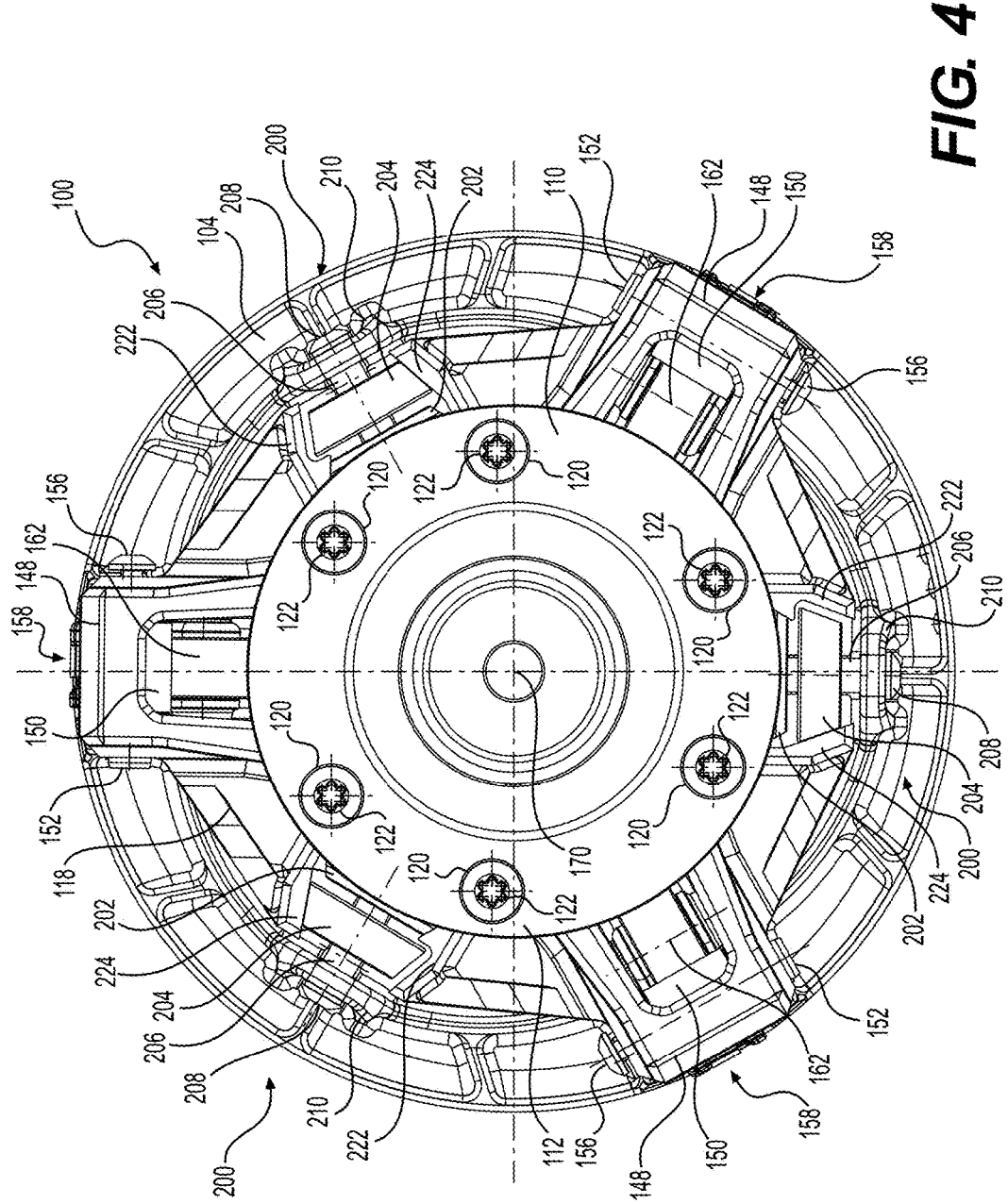
FIG. 4 is a left side elevation view of the drive pulley of FIG. 3, with the drive pulley in an opened position.
Figure 5:
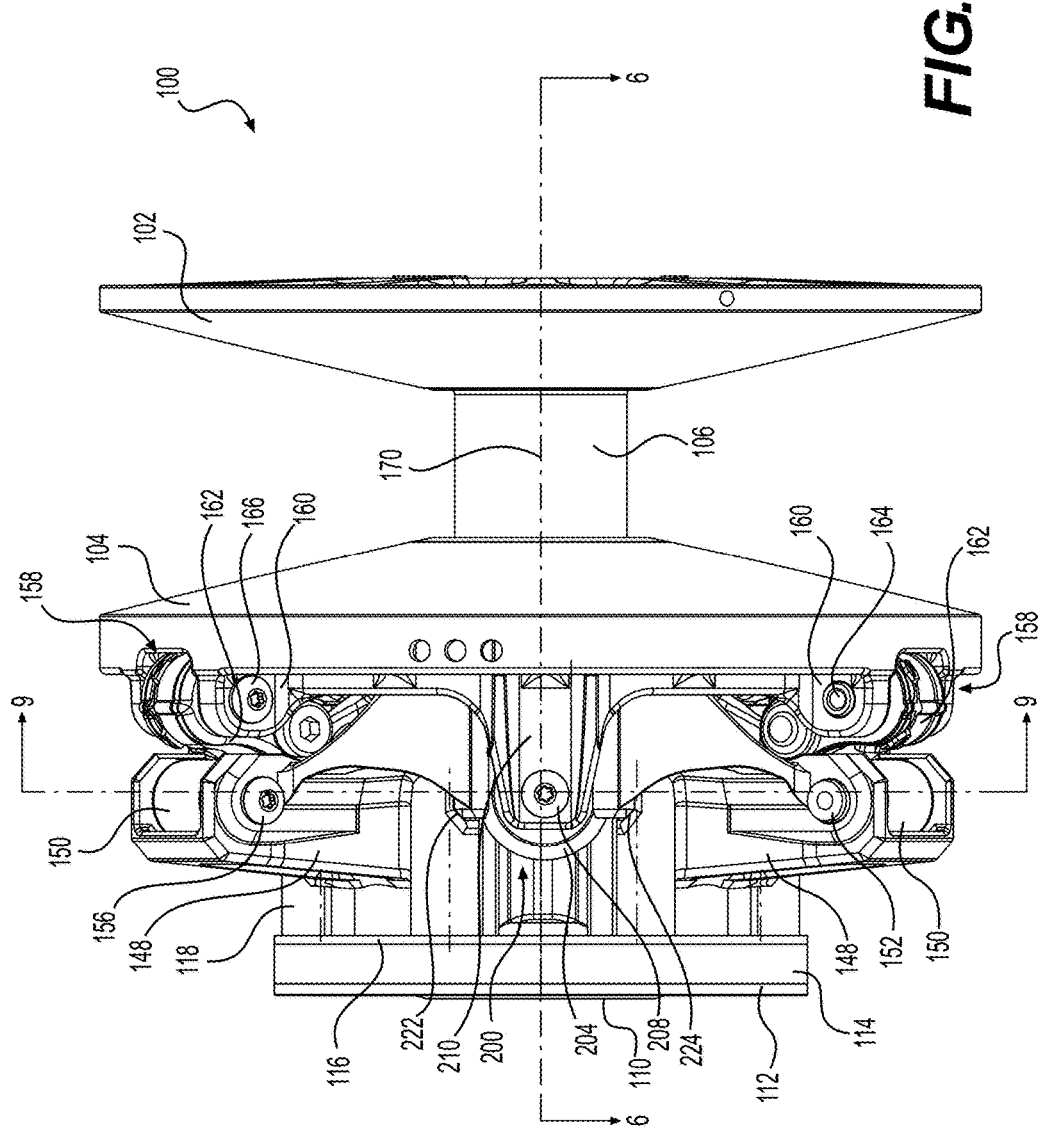
FIG. 5 is a bottom plan view of the drive pulley of FIG. 3, with the drive pulley in an opened position.

A spider 118 is disposed around the fixed sheave shaft 106 and axially between the ring 116 and the movable sheave 104. The spider 118 is axially fixed relative to the fixed sheave 102. As can be seen in FIGS. 3 and 4, six apertures 120 are formed in the ring 112 and the damper 114. The ring 116 has six corresponding apertures (not shown). Six fasteners 122 (FIG. 4) are inserted through the apertures 120, through the ring 116 and into apertures 124 (FIG. 9) of the spider 118 to fasten the ring 116 to the spider 118. As a result, torque is transferred between the fixed sheave shaft 106 and the spider 118 via the cap 110, the rubber damper 114 and the ring 116. The damper 114 dampens the torque variations from the fixed sheave shaft 106 resulting from the combustion events in the engine 24. The spider 118 therefore rotates with the fixed sheave shaft 106.

As can be seen in FIG. 6, a movable sheave shaft 126 is disposed around the fixed sheave shaft 106. The movable sheave 104 is press-fitted on the movable sheave shaft 126 such that the movable sheave 104 rotates and moves axially with the movable sheave shaft 126. It is contemplated that the movable sheave 104 could be connected to the movable sheave shaft 126 in other known manners to make the movable sheave 104 rotationally and axially fixed relative to the shaft 126. It is also contemplated that the movable sheave 104 and the movable sheave shaft 126 could be integrally formed. Two bushings 128, 130 are disposed radially between and abut the movable sheave shaft 126 and the fixed sheave shaft 106. The bushings 128, 130 are disposed adjacent opposite ends of the movable sheave 126. Clips 132 disposed on either sides of each of the bushings 128, 130 prevent the bushing 128, 130 from moving axially relative to the movable sheave shaft 126. As such, as the movable sheave 104, and therefore the movable sheave shaft 126, moves axially relative to the fixed sheave shaft 106, the bushings 128, 130 move axially together with the movable sheave shaft 126 and therefore move axially relative to the fixed sheave shaft 106. The bushings 128, 130 are made of a relatively low friction material thereby permitting easy axial movement of the movable sheave shaft 126 along the fixed sheave shaft 106. Examples of low friction material include, but are not limited to, brass and polyoxymethylene.

As can also be seen in FIG. 6, an annular space 134 is defined between the bushings 128, 130, the movable sheave shaft 126 and the fixed sheave shaft 106. As can be seen, no component of the drive pulley 100 is disposed inside this space 134. As such, the annular space 134 extends continuously between the bushing 128, 130. Therefore, the construction of the illustrated implementation allows the length of the bushings 128, 130 in the axial direction to be selected in order to achieve a desired balance between the amount of friction generated by the bushings 128, 130 in the axial direction and their resistance to wear. For example, the bushings 128, 130 could be longer than illustrated. It is also contemplated that a single bushing or more than two bushings could be provided radially between the shafts 106, 126.

Figure 9:
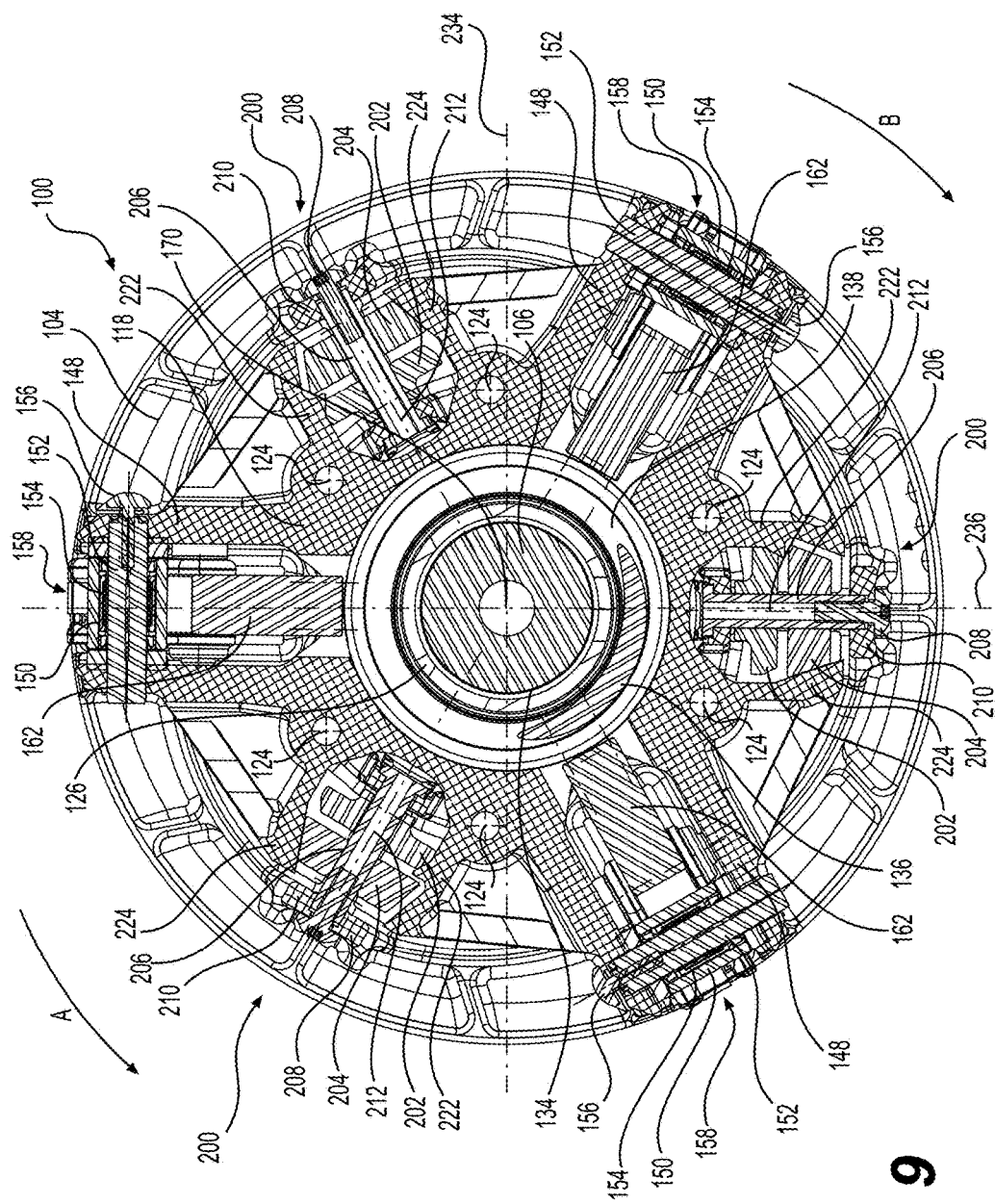
FIG. 9 is a cross-sectional view of the drive pulley of FIG. 3 taken through line 9-9 of FIG. 5, with the drive pulley in an opened position.

To transmit torque from the spider 118 to the movable sheave 104, a torque transfer assembly consisting of three roller assemblies 200 connected to the movable sheave 104 is provided. The roller assemblies 200 are disposed radially outward of the fixed and movable sheave shafts 106, 126. The roller assemblies 200 engage the spider 118 so as to permit low friction axial displacement of the movable sheave 104 relative to the spider 118 and to eliminate, or at least minimize, rotation of the movable sheave 104 relative to the spider 118. As described above, torque is transferred from the fixed sheave 106 to the spider 118 via the damper 114. The spider 118 engages the roller assemblies 200 which transfer the torque to the movable sheave 104 with no, or very little, backlash. As such, the spider 118 is considered to be rotationally fixed relative to the movable sheave 104. The three roller assemblies 200 are disposed at 120 degrees from each other as best seen in FIG. 9. It is contemplated that the roller assemblies 200 could be connected to the spider 118 and engage the movable sheave 104. It is contemplated that in some implementations, the torque transfer assembly could have more or less than three roller assemblies 200. The roller assemblies 200 will be described in greater detail below.

Figure 8:
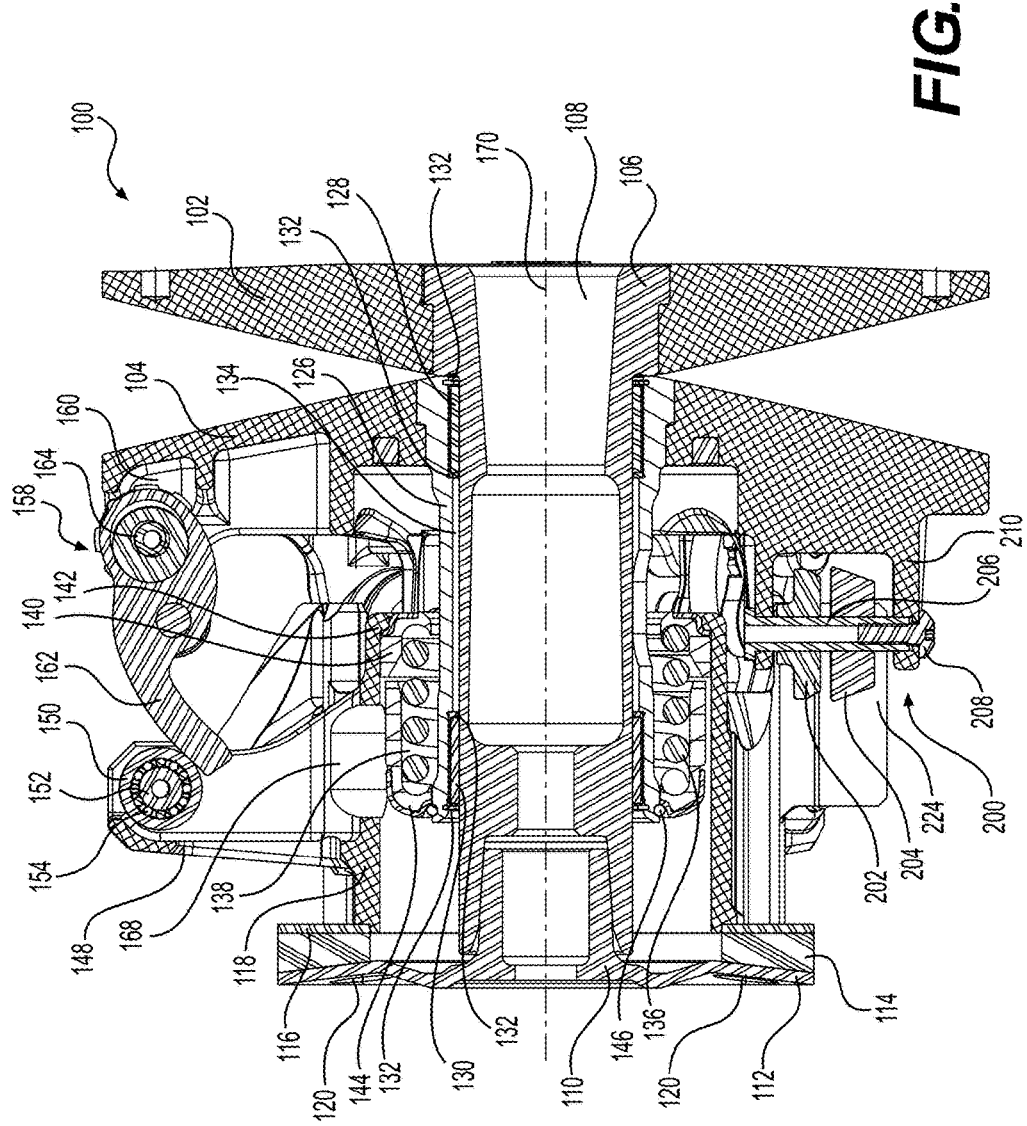
FIG. 8 is a cross-sectional view of the drive pulley of FIG. 3 taken through line 8-8 of FIG. 7, with the drive pulley in a closed position.

As can be seen in FIG. 6, a biasing member in the form of a coil spring 136 is disposed inside a cavity 138 defined radially between the movable sheave shaft 126 and the spider 118. At one end, the spring 136 abuts a fixed spring seat 140. The spring 136 biases the fixed spring seat 140 against a lip 142 of the spider 118, and therefore the fixed spring seat 140 is axially fixed relative to the spider 118. At the opposite end, the spring 136 abuts a movable spring seat 144. The movable spring seat 144 is held in place near the end of the movable sheave shaft 126 by the spring 136 and a C-clip 146 engaging the movable sheave shaft 126, thereby making the movable spring seat 144 axially fixed relative to the movable sheave shaft 126. As a result, this end of the spring 136 (i.e. the left end with respect to FIG. 6) and the movable spring seat 144 move axially relative fixed sheave shaft 106 when the movable sheave 104 and the movable sheave shaft 126 move axially. As the movable sheave 104 and the movable sheave shaft 126 move axially toward the fixed sheave 102, the spring 136 gets compressed as can be seen in FIG. 8. The spring 136 biases the movable sheave 104 and the movable sheave shaft 126 away from the fixed sheave 102 toward their position shown in FIG. 6. It is contemplated that, in some implementations, the movable sheave 104 could be biased away from the fixed sheave 102 by mechanisms other than the spring 136. As can be seen in FIGS. 6 and 8, the bushing 128 is disposed axially between the spring 136 and the fixed sheave 102 and the bushing 130 is disposed in part axially between the ends of the spring 136.

As best seen in FIG. 3, the spider 118 has three arms 148 disposed at 120 degrees from each other. Three rollers 150 are rotatably connected to the three arms 148 of the spider 132. As shown in FIG. 9, each roller 150 is disposed around an axle 152. Needle bearings 154 are disposed between the rollers 150 and the axles 152. The axles 152 are inserted into apertures in their respective arms 148. Threaded fasteners 156 fasten the axles 152 to their respective arms 148.

Three centrifugal actuators 158 are pivotally connected to three brackets 160 formed by the movable sheave 104. Each roller 150 is aligned with a corresponding one of the centrifugal actuators 158. Since the spider 118 and the movable sheave 104 are rotationally fixed relative to each other, the rollers 150 remain aligned with their corresponding centrifugal actuators 158 when the shafts 106, 126 rotate. Also, since the roller assemblies 200 prevent backlash between the spider 118 and the movable sheave 104, wear of the centrifugal actuators 158 that would have resulted from this backlash is prevented. As best seen in FIG. 9, the centrifugal actuators 158 are disposed at 120 degrees from each other. The centrifugal actuators 158 and the roller assemblies 200 are arranged in an alternating arrangement and are disposed at 60 degrees from each other. It is contemplated that the rollers 150 could be pivotally connected to the brackets 160 and that the centrifugal actuators 158 could be connected to the arms 148 of the spider 118. It is also contemplated that there could be more or less than three centrifugal actuators 158, in which case there would be a corresponding number of arms 148, rollers 150 and brackets 160. It is also contemplated that the rollers 150 could be omitted and replaced with surfaces against which the centrifugal actuators 158 can slide as they pivot.

In the present implementation, each centrifugal actuator 158 includes an arm 162 that pivots about an axle 164 connected to its respective bracket 160 by a threaded fastener 166. The position of the arms 162 relative to their axles 164 can be adjusted. It is contemplated that the position of the arms 162 relative to their axles 164 could not be adjustable. Additional detail regarding centrifugal actuators of the type of the centrifugal actuator 158 can be found in International Application Publication No. WO2013/032463 A2, published Mar. 7, 2013, the entirety of which is incorporated herein by reference.

A general operation of the drive pulley 100 will now be described. When the driving shaft is not turning or is turning at low speeds, the drive pulley 100 is in the configuration shown in FIGS. 3 to 6. As can be seen in FIG. 6, under these conditions, the ends of the arms 162 are received in apertures 168 defined in the spider 118. As the speed of rotation of the driving shaft increases, the speed of rotation of the drive pulley 100 increases with it. As a result, the arms 162 of the centrifugal actuators 158 pivot about their respective axles 164, thereby moving away from the movable sheave 104. As the arms 162 of the centrifugal actuators 158 pivot, they push against the rollers 150 to move the movable sheave 104 and the movable sheave shaft 126 axially toward the fixed sheave 102. As the movable sheave 104 and the movable sheave shaft 126 move axially toward the fixed sheave 102, the roller assemblies 200 roll along surfaces of the spider 118 as will be described below. When the speed of rotation of the driving shaft is high enough, the movable sheave 104 and the movable sheave shaft 126 move to the position shown in FIGS. 8 and 9, which is as close as the movable sheave 104 can be to the fixed sheave 102. As the speed of rotation of the driving shaft decreases, the centrifugal actuators 158 pivot back toward the movable sheave 104 and the spring 136 moves the movable sheave 104 and the movable sheave shaft 126 axially away from the fixed sheave 102. As the movable sheave 104 and the movable sheave shaft 126 move axially away from the fixed sheave 102, the roller assemblies 200 roll along surfaces of the spider 118 as will be described below.

Figure 10:
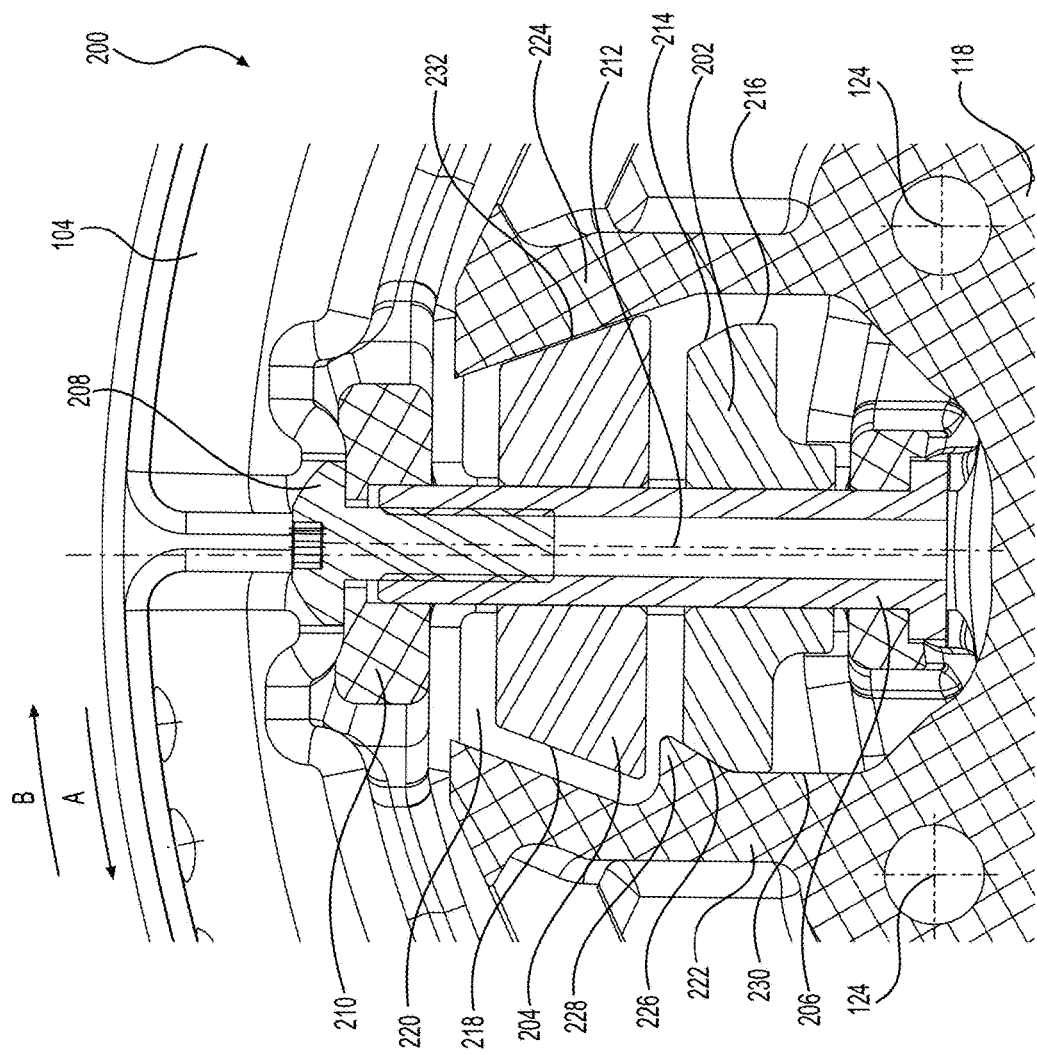
FIG. 10 is a close-up view of a roller assembly of the drive pulley of FIG. 3 taken through line 9-9 of FIG. 5.

Turning now to FIGS. 9 and 10, one of the three roller assemblies 200 will be described in more detail. As the three roller assemblies 200 are identical, only one will be described. It is contemplated that at least one of the roller assemblies 200 could differ from the others.

The roller assembly 200 has two rollers 202, 204 rotationally mounted on a radially extending axle 206. The rollers 202, 204 can slide along the axle 206. The axle 206 is fastened by a threaded fastener 208 to a bracket 210 formed by the movable sheave 104. The axis 212 of the axle 206 intersects and is perpendicular to the axis of rotation 170 of the fixed sheave shaft 106. The rollers 202, 204 rotate about the axis 212.

As can be seen, the roller 204 is disposed radially outward of the roller 202. As can also be seen, the roller 204 is thicker, has a larger diameter, and therefore is larger overall, than the roller 202. The rollers 202, 204 are made of a plastic such as, but not limited to, polyimide-based plastics. It is contemplated that the rollers 202, 204 could be made of any other suitable material such as, but not limited to, aluminum or other metals. In the present implementation, both rollers 202, 204 are made of the same material, therefore since the roller 204 is bigger than the roller 202, the roller 204 is also heavier than the roller 202. It is contemplated that the two rollers 202, 204 could not be made of the same material and/or that the roller 204 could be smaller than the roller 202, but that the roller 204 would still be heavier than the roller 202.

As can be seen in FIG. 10, the roller 202 is partially tapered and the roller 204 is tapered. The roller 202 has an angled surface 214 that extends toward the axis 212 as it extends away from the axis of rotation 170 of the fixed sheave shaft 106 and a surface 216 that is parallel to the axis 212. The angled surface 214 is disposed at an angle between 15 and 45 degrees relative to the axis 212 and relative to the surface 216. As can be seen the angled surface 214 is disposed radially outward of the surface 216 with respect to the axis of rotation 170 of the fixed sheave shaft 106. The roller 204 has an angled surface 218 that extends toward the axis 212 as it extends away from the axis of rotation 170 of the fixed sheave shaft 106. The angled surface 218 is disposed at an angle between 10 and 40 degrees relative to the axis 212.

For each roller assembly 200, the spider 118 defines a passage 220 inside which the two rollers 202, 204 are received as can be seen in FIG. 10. The passage 220 is defined by walls 222 and 224 disposed on either side of the rollers 202, 204. The roller 202 abuts the wall 222 but is spaced from the wall 224 to prevent unwanted friction between roller 202 and wall 224 which would otherwise occur during operation. The angled surface 214 of the roller 202 abuts and angled surface 226 of the wall 222 defined by a projection 228 of the wall 222. The angled surface 226 is disposed at the same angle relative to the axis 212 as the angled surface 214. The surface 216 of the roller 202 abuts a surface 230 of the wall 222 that is parallel to the axis 212. The roller 204 abuts the wall 224 but is spaced from the wall 222 to prevent unwanted friction between roller 202 and wall 222 which would otherwise occur during operation. The angled surface 218 of the roller 204 abuts an angled surface 232 of the wall 224. The angled surface 232 is disposed at the same angle relative to the axis 212 as the angled surface 218. As can be seen in FIG. 10, the contact surface between the roller 204 and the wall 224 (i.e. the surface where the surface 218 touches the surface 232) is larger than the contact surface between the roller 202 and the wall 222 (i.e. the surface where the surfaces 214, 216 touch the surfaces 226, 230).

When the drive pulley 100 turns, the centrifugal forces on the rollers 202, 204 push the rollers 202, 204 radially outwardly with respect to the axis of rotation 170 of the fixed sheave shaft 106 along the axis 212. As a result, the surface 214 of the roller 202 pushes against the surface 226 of the wall 222, thereby pushing the spider 118 in the direction of arrow A, and the surface 218 of the roller 204 pushes against the surface 232 of the wall 224, thereby pushing the spider 118 in the direction of arrow B. As a result, the rollers 202, 204 eliminate backlash between the spider 118 and the movable sheave 104 thus eliminating, or at least reducing, wear of the arms 162 and the rollers 150 that would otherwise have resulted from rotation of the movable sheave 104 relative to the spider 118. At the position illustrated in FIG. 10, the rollers 202 and 204 are radially positioned along axis 212 as far as they can move away from the axis of rotation 170. Although the centrifugal forces acting upon each roller 202, 204 will increase with an increase of the rotation speed of the drive pulley 100, further radially outward movement of the roller 204 is prevented by the flat surface 216 of the roller 202 that abuts the surface 230. At the same time, the angled surface 226 prevents the roller 202 from any further radially outward movement along the axis 212. This relative placement of rollers 202 and 204 with respect to their respective walls 222 and 224 and the centrifugal actuators 158 is such that the arms 162 are aligned with their respective rollers 150 when the rollers 202 and 204 are in their maximum radially outward position along the axis 212 as shown in FIG. 10. As such, the roller 204 eliminates backlash when the spider 118 applies torque to the movable sheave 104 in the direction indicated by arrow A (FIGS. 9 and 10), such as when the drive pulley 100 is turned in the direction indicated by arrow A. The roller 202 eliminates backlash when the spider 118 applies torque in the direction indicated by arrow B (FIGS. 9 and 10), such as when the drive pulley 100 turns in the direction indicated by arrow B to make the snowmobile move backward, or during engine braking. Also, since the rollers 202, 204 can slide along the axle 206, as the rollers 202, 204 wear or undergo thermal expansion or contraction, they will nonetheless continue to make contact with the surfaces 226, 232 and therefore continue to locate the actuators 158 in the desired alignment with the rollers 150.

As described above, roller 204 has a greater mass than that of roller 202. This result in the outer roller 204 generating more centrifugal forces than the inner roller 202 such that the influence of the roller 202 is not great enough to cause the roller 204 to slide along the surface 232 towards the axis 170. The centrifugal force applied by the roller 204 onto the surface 232 also counteracts the force applied from the belt 76 to the moveable sheave 104. During operation, once the moveable sheave 104 makes contact with the belt 76, the belt 76 applies a torque in a direction (arrow B in FIG. 10) opposite to that of the rotation of the moveable sheave 104 (arrow A in FIG. 10) and thus pressure between the roller 204 and the surface 232 increases and applies a force to push the roller 204 radially inward towards the axis 170. This force, and therefore the movement of the roller 204 toward the axis 170, is countered by the centrifugal force acting on the roller 204. As such, the mass of the roller 204 should be selected so as to be large enough to ensure it does not move inwards due to the torque from the belt 76. It is contemplated that the mass, size and shape of the rollers 202, 204 could differ from the description provided above, but while still having the outer roller 204 generate more centrifugal forces than the inner roller 202 and while still having the torque resulting from the centrifugal forces generated by the rollers 202, 204 be sufficient to counter the effects of the torque applied by the belt 76 in the direction of the arrow B (FIG. 10). By having the torque resulting from the centrifugal forces generated by the rollers 202, 204 being sufficient to counter the effects of the torque applied by the belt 76 in the direction of the arrow B, rotation of the movable sheave 104 relative to the spider 118 is prevented, thereby preventing wear on the ramps 162 and rollers 154 which may otherwise result from such relative rotation. It is also contemplated that the outer roller 204 could abut the wall 222 (and not the wall 224) and the inner roller 202 could abut the wall 224 (and not the wall 222), in which case the mass, size and shape of the rollers 202, 204 should be selected such that the inner roller 202 generate more centrifugal forces than the outer roller 204 and such that the inner roller 202 generates enough centrifugal force to counter the effects of the torque applied by the belt 76 in the direction of the arrow B (FIG. 10).

As can be seen by comparing FIGS. 5 and 6 to FIGS. 7 and 8, the rollers 202, 204 roll along the walls 222, 224 respectively as the movable sheave 104 moves axially relative to the fixed sheave shaft 106. Since the rollers 202, 204 roll, torque is transferred between the spider 118 and the movable sheave 104 while offering very little resistance to the axial displacement of the movable sheave 104.

It is contemplated that the two rollers 202, 204 could be mounted on different axles while still rolling along two walls 222, 224 of the spider 118, which may have to be disposed further apart. However, the two rollers 202, 204 of a roller assembly 200 should be sufficiently close to each other so as to be on a same side of a plane, such as the plane 234 (FIG. 9), containing the axis of rotation 170 of the fixed sheave shaft 106 and on a same side of another plane, such as the plane 236 (FIG. 9) containing the axis of rotation 170 of the fixed sheave shaft 106 and being perpendicular to the first plane. In other words, the two rollers 202, 204 of a roller assembly 200 should be at less than 90 degrees from each other.

Figure 11:
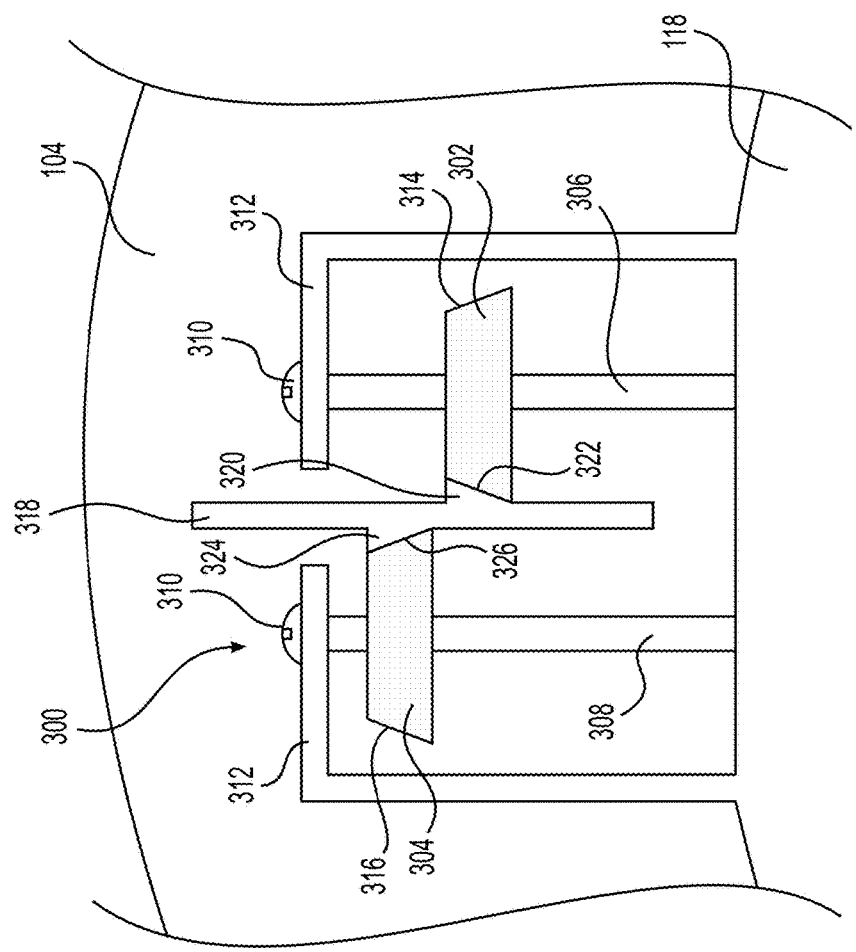
FIG. 11 is a schematic illustration of an alternative implementation of a roller assembly of the drive pulley of FIG. 3.

FIG. 11 schematically illustrates a roller assembly 300 that is an alternative implementation of the roller assembly 200. The roller assembly 300 has two rollers 302, 304. The roller 302 is rotationally mounted on an axle 306 and the roller 304 is rotationally mounted on an axle 308. The rollers 302, 304 can slide along their respective axles 306, 308. The axles 306, 308 are fastened by threaded fasteners 310 to brackets 312 formed by the spider 118. The roller 302 is tapered and as such has an angled surface 314. The roller 304 is also tapered and as such has an angled surface 316.

The movable sheave 104 defines a wall 318 received between the rollers 302, 304. The wall 318 has a projection 320 on a side thereof facing the roller 302 defining an angled surface 322 having the same angle as the surface 314. The wall 318 has a projection 324 on a side thereof facing the roller 304 defining an angled surface 326 having the same angle as the surface 316. As can be seen, the projection 324 is more radially outward than the projection 322.

When a drive pulley 100 having roller assemblies 300 turns, the surfaces 314, 316 of the rollers 302, 304 push against their respective surfaces 322, 326 of the wall 318, thereby holding the wall 318 between the rollers 302, 304 and eliminating backlash. As the movable sheave 104 moves axially relative to the fixed sheave 102, the rollers 302, 304 roll along their respective sides of the wall 318, thereby offering very little resistance to the axial displacement of the movable sheave 104.

Figure 12:
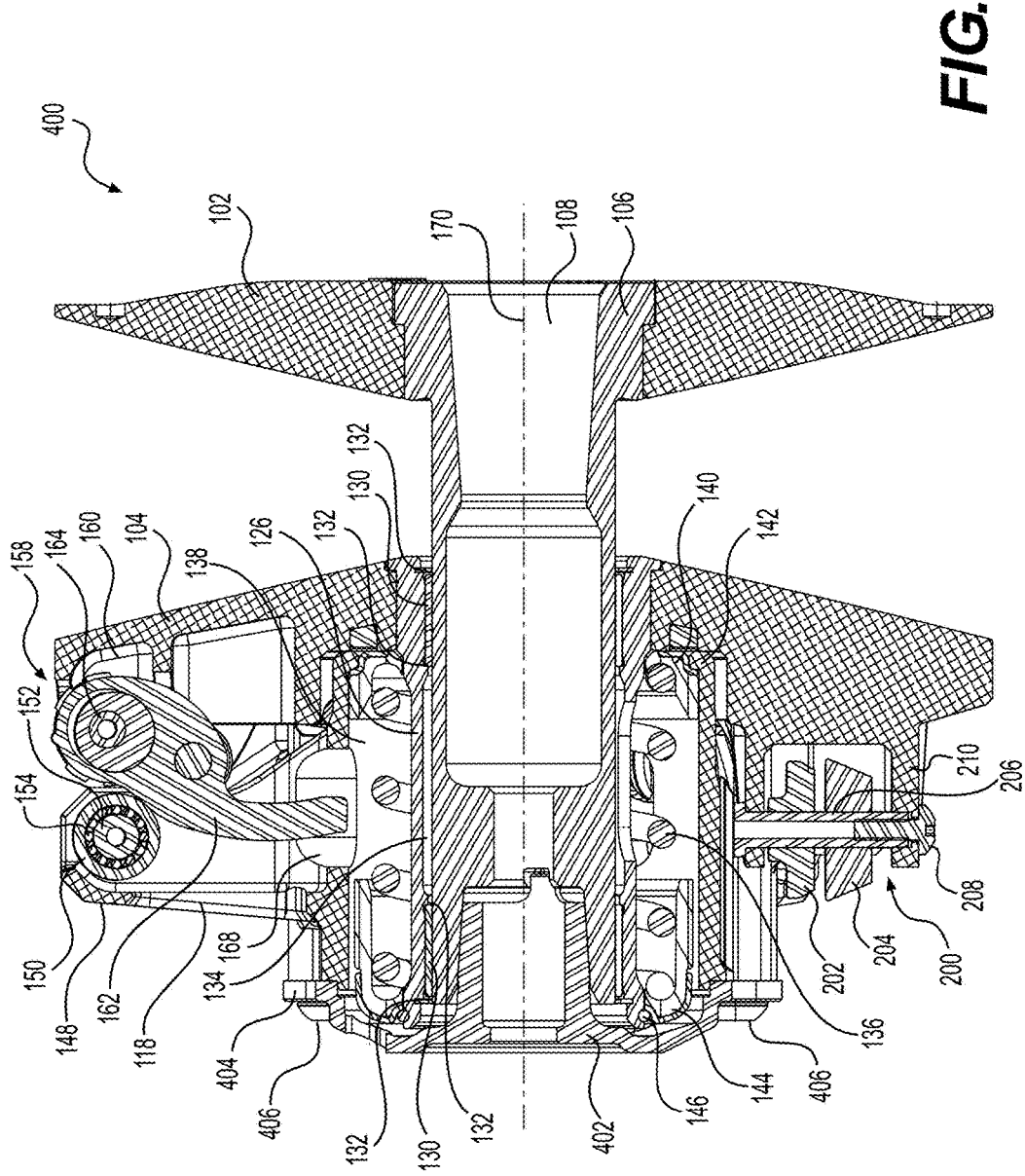
FIG. 12 is a cross-sectional view of an alternative implementation of the drive pulley of FIG. 3, with the alternative implementation of the drive pulley in an opened position.

FIG. 12 illustrates a drive pulley 400 that is an alternative implementation of the drive pulley 100 described above. For simplicity, elements of the drive pulley 400 that are similar to those of the drive pulley 100 have been labelled with the same reference number and will not be described again herein.

In the drive pulley 400, the cap 110, the damper 114 and the ring 116 of the drive pulley 100 have been replaced by a cap 402. The cap 402 has an outer peripheral flange 404. Fasteners 406 are inserted through the flange 404 and into the spider 118 to connect the cap 402 directly to the spider 118.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A drive pulley for a continuously variable transmission comprising:
   a fixed sheave having an axis of rotation;
   a movable sheave axially movable relative to the fixed sheave;
   a spider axially fixed relative to the fixed sheave and rotationally fixed relative to the movable sheave, the movable sheave being disposed axially between the spider and the fixed sheave;
   a biasing member biasing the movable sheave axially away from the fixed sheave;
   at least one centrifugal actuator including an arm pivotally connected to one of the movable sheave and the spider, the arm pivoting away from the one of the movable sheave and the spider as a speed of rotation of the drive pulley increases, the arm pushing against another one of the movable sheave and the spider as the arm pivots away from the one of the movable sheave and the spider, thereby moving the movable sheave axially toward the fixed sheave;
   a first roller rotationally connected to one of the movable sheave and the spider and abutting another one of the movable sheave and the spider to transfer a first torque to the other one of the movable sheave and the spider in a first direction; and
   a second roller rotationally connected to the one of the movable sheave and the spider and abutting the other one of the movable sheave and the spider to transfer a second torque to the other one of the movable sheave and the spider in a second direction opposite the first direction.

2. The drive pulley of claim 1, wherein the first and second rollers are rotationally connected to the movable sheave.

3. The drive pulley of claim 1, wherein:
   the first roller is heavier than the second roller; and
   when the drive pulley is rotating, a magnitude of the first torque is greater than a magnitude of the second torque.

4. The drive pulley of claim 3, further comprising a radially extending axle connected to the movable sheave;
   wherein the first and second rollers are rotationally mounted to the axle and are rotatable about an axis of the axle.

5. The drive pulley of claim 4, wherein at least one of the first and second rollers are slidable along the axle.

6. The drive pulley of claim 5, wherein:
   the other one of the movable sheave and the spider defines a surface;
   one of the first and second rollers abuts the surface to prevent sliding of the one of the first and second rollers.

7. The drive pulley of claim 2, wherein:
   the spider defines a passage between a first wall and a second wall;
   the first and second rollers are disposed in the passage;
   the first roller abuts and rolls along the first wall and is spaced from the second wall; and the second roller abuts and rolls along the second wall and is spaced from the first wall.

8. The drive pulley of claim 7, wherein: the first roller is larger than the second roller; and
the first roller is disposed radially outward of the second roller.

9. The drive pulley of claim 7, wherein:
the first roller is heavier than the second roller; and
the first roller is disposed radially outward of the second roller.

10. The drive pulley of claim 7, wherein:
a first surface of the first roller abutting the first wall is angled relative to an axis of rotation of the first roller;
a second surface of the first wall abutting the first surface of the first roller is angled relative to the axis of rotation of the first roller;
a third surface of the second roller abutting the second wall is angled relative to an axis of rotation of the second roller; and
a fourth surface of the second wall abutting the third surface of the second roller is angled relative to the axis of rotation of the second roller.

11. The drive pulley of claim 10, wherein:
a fifth surface of the second roller abutting the second wall is parallel to the axis of rotation of the second roller; and
a sixth surface of the second wall abutting the fifth surface of the second roller is parallel to the axis of rotation of the second roller.

12. The drive pulley of claim 10, wherein:
the first and second surfaces extend toward the axis of rotation of the first roller as they extend away from the axis of rotation of the fixed sheave; and
the third and fourth surfaces extend toward the axis of rotation of the second roller as they extend away from the axis of rotation of the fixed sheave.

13. The drive pulley of claim 1, wherein the first and second rollers rotate about a common axis of rotation, the common axis of rotation being perpendicular to and intersecting the axis of rotation of the fixed sheave.

14. The drive pulley of claim 1, wherein the at least one centrifugal actuator is three centrifugal actuators disposed at 120 degrees from each other;
wherein the first roller is three first rollers disposed at 120 degrees from each other;
wherein the centrifugal actuators and first rollers are arranged in an alternating arrangement and are disposed at 60 degrees from each other;
wherein the second roller is three second rollers disposed at 120 degrees from each other;
wherein the centrifugal actuators and second rollers are arranged in an alternating arrangement and are disposed at 60 degrees from each other.

15. The drive pulley of claim 1, wherein the arm of the at least one centrifugal actuator abuts a third roller rotationally connected to the other one of the movable sheave and the spider.

16. The drive pulley of claim 1, further comprising a damper connecting the fixed sheave to the spider and transferring torque between the fixed sheave and the spider.

17. The drive pulley of claim 1, further comprising:
a fixed sheave shaft connected to the fixed sheave; and
a movable sheave shaft connected to the movable sheave, the fixed sheave shaft being disposed at least in part inside the movable sheave shaft;
wherein the movable sheave shaft is disposed at least in part inside the biasing member; and
wherein the biasing member is disposed at least in part inside the spider.

18. The drive pulley of claim 1, wherein as the first and second rollers wear, the first and second rollers continue to roll along the other one of the movable sheave and the spider as the movable sheave moves axially.

19. A vehicle comprising:
a frame;
a motor connected to the frame;
a continuously variable transmission comprising:
the drive pulley of claim 1;
a driven pulley having:
a fixed sheave; and
a movable sheave axially movable relative to the fixed sheave; and
a drive belt looped around the fixed and movable sheaves,
the drive pulley being operatively connected to and driven by the motor;
a driven shaft connected to and driven by the driven pulley; and
at least one ground engaging member operatively connected to the driven shaft.

20. The vehicle of claim 19, wherein:
the frame includes a tunnel; and
the at least one ground engaging member is a drive track disposed at least in part under the tunnel;
the vehicle further comprising:
at least one ski operatively connected to the frame; and
a straddle seat disposed above the tunnel.

* * * * *